April 22, 1952  L. GREFFE  2,594,153
FOLDING BASKET

Filed May 6, 1950  3 Sheets-Sheet 1

INVENTOR
LEO GREFFE
BY
Amédée Langlois
AGENT

April 22, 1952  L. GREFFE  2,594,153
FOLDING BASKET

Filed May 6, 1950  3 Sheets-Sheet 2

INVENTOR
LEO GREFFE
BY

AGENT

April 22, 1952  L. GREFFE  2,594,153
FOLDING BASKET
Filed May 6, 1950  3 Sheets-Sheet 3
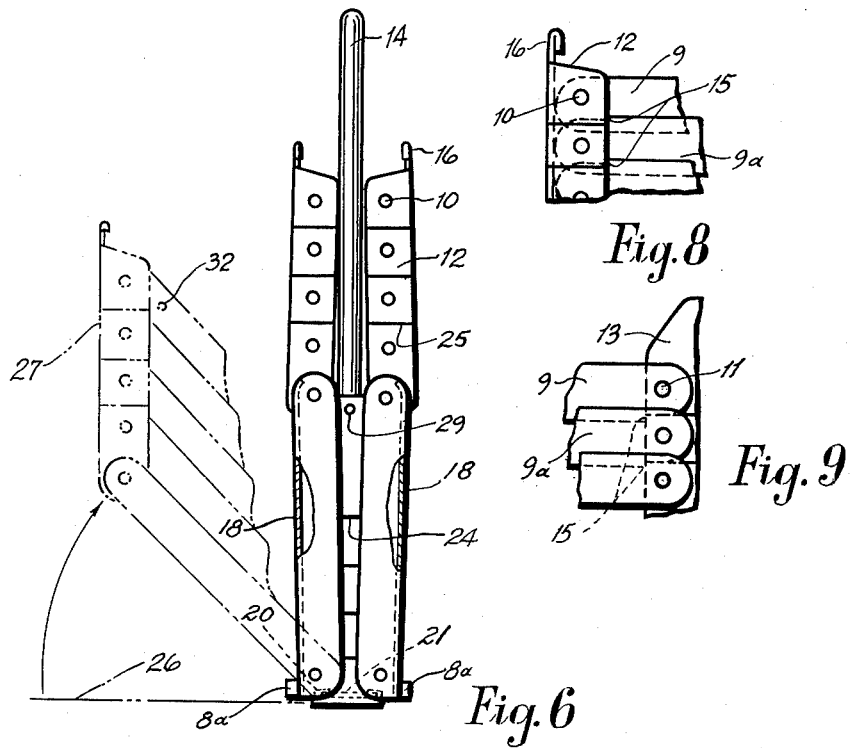
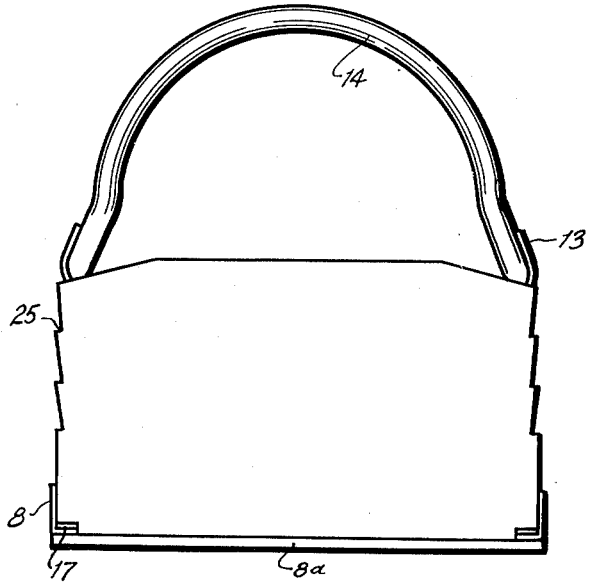
INVENTOR
LEO GREFFE
BY
AGENT Patented Apr. 22, 1952

2,594,153

UNITED STATES PATENT OFFICE 2,594,153

FOLDING BASKET

Leo Greffe, Windsor, Ontario, Canada

Application May 6, 1950, Serial No. 160,559
In Canada August 30, 1949

1 Claim. (Cl. 220—6)

This invention relates to baskets of the ordinary type when open with a carrying handle in the centre, but which is made so as to be folded flat against the handle, in this way the basket can be carried without any inconvenience when folded, and it can be readily opened by simply spreading the sides to its full open position.

One advantage of my basket is that a number of them can be hung up in a narrow space in a store, thus saving much room in storage.

Another aspect of my invention is that a person can easily carry two of my baskets in one hand when folded.

One great advantage of my invention is its use in grocery stores where baskets are supplied to customers for picking up their goods, for the space taken up by the baskets now used, a dozen or more of my baskets can be hung up in the space taken up by one of the baskets used at present.

Another object of my invention is to make a basket very light in weight most easily foldable and opened and so made as to support a fairly good weight of merchandise, and as may be seen by an inspection of the drawings, half of the basket only can be opened, if it should be so desired, in this way it can be carried without inconvenience by the person using it. If it should be found necessary to fully open the basket, all there is to do is to spread the other side open which can be done with one hand.

As can also be seen, the basket is so made as to endure rough handling by the users due to the fact that all parts are made to work smoothly and to remain steady on multiple shoulders so disposed as to eliminate all possible breakage and bending.

Still a further object of my invention is its use in carrying bottles of soft drinks. As it is at present the cartons used for that purpose are necessitating a larger storage space, and furthermore, the paper cartons are easily torn or broken in handling, besides of being quite expensive, whereas in the case of my basket, a great saving would therefor take place by the manufacturers of soft drinks, and also by the bakers and dairies in the transportation of bread and bottles of milk.

My basket can be made as shown on the drawings, but it can also be made of narrow strips of light metal such as aluminum or in such a way as to leave an opening between the slats forming the sides and ends thereof.

It is understood that my basket can be made of different sizes to suit the requirements.

In the drawings which illustrate embodiments of the invention,

Figure 6 is a side elevation showing the basket in folded position, and

Figure 7 is an end elevation of the basket in open position,

Figure 8 shows in detail how the slats abut against the vertical face of the upright pieces 12, at 15, and Figure 9 shows how the slats abut against the vertical face of the brackets 13.

Figure 1:
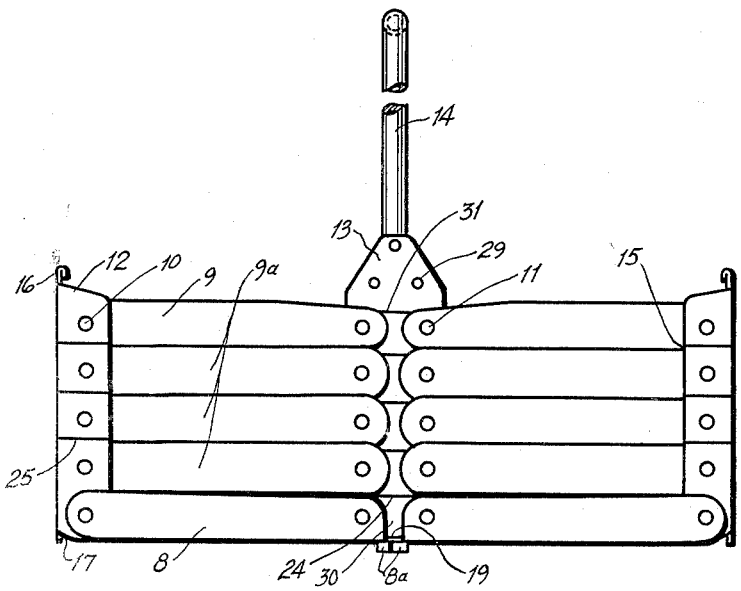
Figure 1 is a side elevation of the basket in open position.
Figure 2:
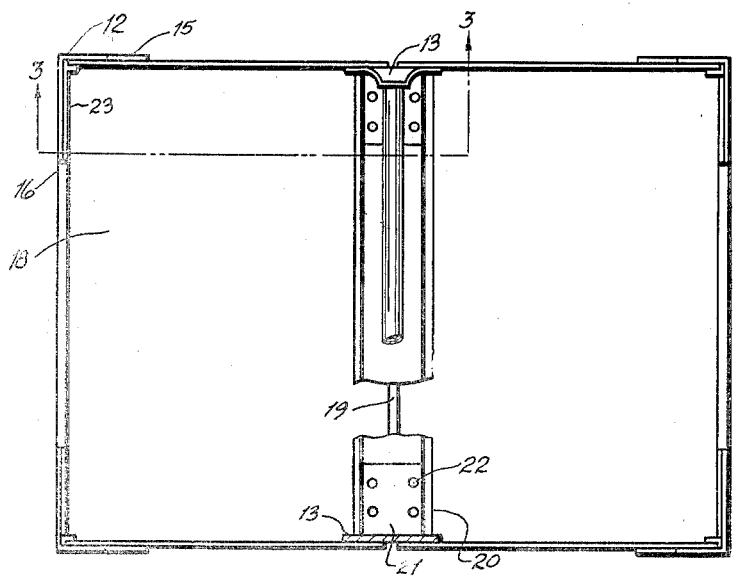
Figure 2 is a plan view of the basket in open position.
Figure 3:
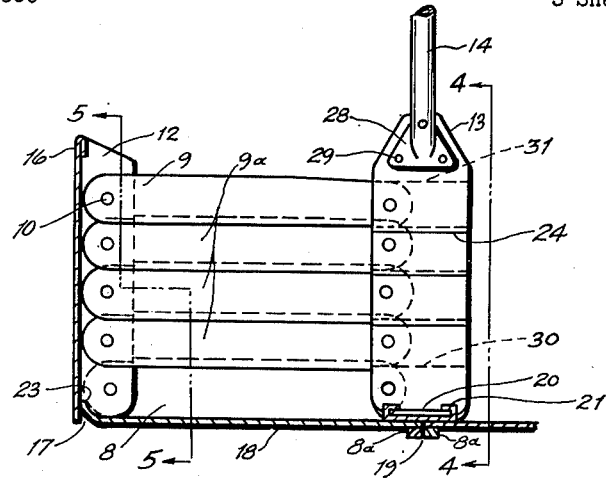
Figure 3 is a sectional side elevation showing inside corners and centre brackets.

As stated in the preamble of the description, my basket when open, is substantially rectangular in shape with a carrying handle 14 in the centre, this will be easily seen in Figures 1 and 2.

It is adapted to be folded up flat against the handle 14 as shown on Figure 6. It is made of a number of side slats 8—9 and 9 (a), and end panels 16, the slats being arranged for pivoting on rivets 10 and 11, pivots 10 securing the slats to the end corner pieces 12, and pivots 11 securing the slats to the centre brackets 13.

The bottom of the basket is made of two half pieces 18 separated by a narrow gap 19. Numeral 20 is a cross member stiffener. Numeral 21 is an angular piece integral with part of centre bracket 13, and 22 is a rivet securing piece 21 to member 20. Numeral 23 is a perpendicular flange at end of bottom half pieces 18.

Numeral 24 are indentations in centre bracket 13 acting as limit stops for slats 9—9 (a), and the bottom side slats 8. Numeral 17 is a clearance cut out in bottom half pieces 18 at corners, and 25 shows indentations in the end corner pieces acting as limit stops for slats 8—9 and 9 (a).

Numeral 14 is the basket handle and 28 is flanged foot riveted to centre bracket by rivets 29. Numeral 30 is a spacer piece between centre bracket 13 and the bottom side slats 8, and 31 is a spacer piece between the centre bracket 13 and the top side slats 9.

Figures 4, 5:
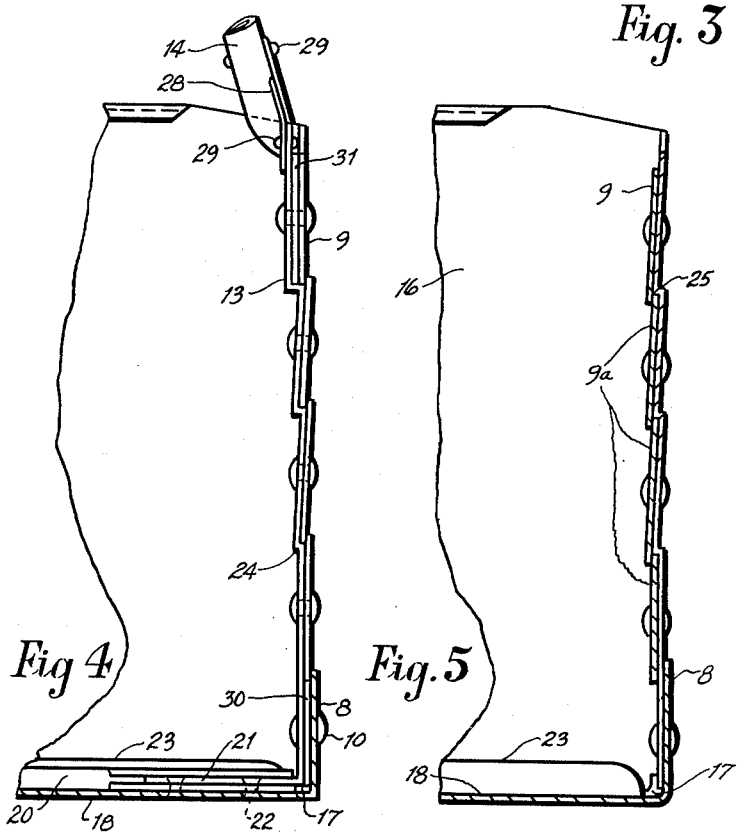
Figure 4 is a cross section through centre of the basket.
Figure 5 is a cross section through the basket corner.

Bottom side slats 8 are integral to bottom half pieces 18 as may be seen by an inspection of Figures 4 and 5.

It should be noted that each slat 9 (a) has sections 15 cut off, this creating a second shoulder abutting against the lower edge of the indentations 24, and against the upper edge of indentations 25 of corner pieces 12, this can be clearly seen in examining Figures 8 and 9 of the drawings.

Apart from the cross stiffening member 20, there are two cross members 8 (a) against which abut the half bottom plates 18 when the basket is opened, these additional shoulders having the effect of further consolidating the parts of the basket when in open position.

To explain the working of the constituting elements of the basket and to show their particular functions, here is what takes place:

The basket is closed as shown in Figures 6 and 7. When it is being opened the slats slide one on the other until the outer end of each slat abuts on the end corner pieces 12, that is against the indented sections 25 of the pieces 12 which constitute a solid shoulder for each slat 9 (a), this being clearly shown in Figures 3, 5, 8 and 9, the same arrangement existing in centre brackets 13 as shown in Figure 4.

A second shoulder holding all parts in steady position when the basket is open is the fact that the half bottom plates abut against each other at their inner edge at the same time that they come to rest against the reinforcing member 20 and 8 (a) which is welded or otherwise secured to the centre brackets 13, and bottom half plates 18.

The outer end of the bottom half pieces 18 are flanged in at 17 so as to smoothly slip on the end panels on opening and closing of the basket.

In order to allow the sides of the basket to close more closely against the handle, I make the inner end of upper slats 9 with a slight curve towards their jointing points with the centre brackets.

It should be noticed that the end corner piece 12 is integral with the end panels 16, that is that each end panel is bent at right angle therewith after having been stamped to form the shoulders 25.

The centre bracket is also stamped to form shoulders 24 on which the inner slats come to rest when the basket is open.

The bottom slats 8 are integral with bottom plates 18, the same as in the end panels, the slats are simply bent at right angle with the plates and rounded at their outer end as shown in Figure 1 of the drawings.

As previously stated, my basket can be opened only on one side of the handle as shown in Figure 6, and that figure also shows that my basket can be carried in such half open position without trouble and until the person carrying it finds necessary to open it in full. This I consider a great improvement on the baskets now in use.

As also shown on the drawings the ends of the basket consist of panels 16, this being done to prevent any possible bulging sideways, and also to render the opening and closing of the basket with more ease by the fact that the hand is applied in full thereon. A stiffening piece 20 is also placed across the bottom of the basket thus preventing absolutely any bending of the end panels and the bottom pieces 18.

En résumé, the end panels and the members 12 are integral, the panels are flat and the members 12 are bent thereof at right angle with the indentations or struck out shoulders stamped on to receive the slats 9 and 9 (a) when the basket is being opened. The same is done with brackets 13 indentations 24 are struck out thereof to act as limit stops for slats 9—9 (a) and 8. The half bottom plates 18 and the lower slats 8 are also integral, the slats 8 being bent thereof at right angles.

Figures 4 and 5 show the indentations 24 and 25 as being inclined instead of vertical. The reason is that the slight inclination in the indentations in bracket 13 and the end pieces 12 and which constitute shoulders for the slats when the baskets are open, is to prevent their opening when not in use, this has the effect of creating a very slight friction on the slats when the baskets are closed and to hold them in that position.

Other means may also be used such as slight projections 32 in the outer end of slats 9 which would have the same effect of holding the sides of the baskets against their handle.

I claim:

In a rectangular basket, the combination with angular corner brackets and a V-shaped handle having flattened extensions secured thereto and extending to the bottom of said basket, a series of overlapping slats forming the side members thereof and pivotly secured to said brackets at one end and to said extensions at their other end, said extensions being bent inwardly at right angles forming horizontal flanges, notches cut in the ends of said slats made to abut against the corner brackets and said extensions when the basket is open, end panel members secured to said brackets, the bottom of the basket being made of two plates each being made to abut against each other at their inner end and bent upwards at their outer end forming a curved flange resting against the inner face of the said end panel members, a reinforcing member across the bottom of the basket and secured to said horizontal flanges and against which said bottom members rest when the basket is open.

LEO GREFFE.

REFERENCES CITED

The following references are of record in the file of this patent:

UNITED STATES PATENTS

| Number | Name | Date |
| --- | --- | --- |
| 529,230 | Zimmerman | Nov. 13, 1894 |
| 1,220,464 | Schreyer | Mar. 27, 1917 |
| 1,506,627 | Francis et al. | Aug. 26, 1924 |
| 2,395,601 | Wenthe | Feb. 26, 1946 |
| 2,501,843 | Concklin | Mar. 28, 1950 |